United States Patent
Eschenhagen

(10) Patent No.: US 10,103,662 B2
(45) Date of Patent: Oct. 16, 2018

(54) METHOD FOR OPERATING AN ELECTRIC MACHINE

(71) Applicants: Robert Bosch GmbH, Stuttgart (DE); SEG AUTOMOTIVE GERMANY GMBH, Stuttgart (DE)

(72) Inventor: Marc Eschenhagen, Moeglingen (DE)

(73) Assignees: ROBERT BOSCH GMBH, Stuttgart (DE); SEG AUTOMOTIVE GERMANY GMBH, Stuttgart (DE)

( * ) Notice: Subject to any disclaimer, the term of this patent is extended or adjusted under 35 U.S.C. 154(b) by 0 days.

(21) Appl. No.: 15/034,173

(22) PCT Filed: Nov. 3, 2014

(86) PCT No.: PCT/EP2014/073571
§ 371 (c)(1),
(2) Date: May 3, 2016

(87) PCT Pub. No.: WO2015/071127
PCT Pub. Date: May 21, 2015

(65) Prior Publication Data
US 2016/0276968 A1 Sep. 22, 2016

(30) Foreign Application Priority Data

Nov. 15, 2013 (DE) .......... 10 2013 223 335
Feb. 13, 2014 (DE) .......... 10 2014 202 602

(51) Int. Cl.
*G01R 31/14* (2006.01)
*G01R 27/08* (2006.01)
(Continued)

(52) U.S. Cl.
CPC .......... *H02P 9/006* (2013.01); *B60L 3/0061* (2013.01); *B60L 3/04* (2013.01); *B60L 7/14* (2013.01);
(Continued)

(58) Field of Classification Search
CPC ...... H02H 1/0015; G01R 31/14; G01R 27/08; G01R 31/25
(Continued)

(56) References Cited

U.S. PATENT DOCUMENTS 4,567,555 A * 1/1986 Matsuse ............... H02M 7/757
318/762
5,816,221 A * 10/1998 Krueger ................ F02N 3/02
123/149 D
(Continued)

FOREIGN PATENT DOCUMENTS

DE 19638478 3/1997
DE 102010030083 12/2011
(Continued)

OTHER PUBLICATIONS

International Search Report dated Feb. 10, 2015 of the corresponding International Application PCT/EP2014/073571 filed Nov. 3, 2014.

*Primary Examiner* — Bentsu Ro
*Assistant Examiner* — Cortez Cook
(74) *Attorney, Agent, or Firm* — Norton Rose Fulbright US LLP; Gerard Messina

(57) ABSTRACT

A method for operating an electric machine having a power inverter, which is electrically connected to a relative ground potential, and a ground differential voltage between the relative ground potential and a reference ground potential is monitored, and if the ground differential voltage reaches an upper limit value, the electric machine is operated in a current-delivering operating state, and if the ground differential voltage reaches a lower limit value, the electric machine is operated in a non-current-delivering operating state.

22 Claims, 6 Drawing Sheets

(51) Int. Cl.
*G01R 31/25* (2006.01)
*H02P 9/00* (2006.01)
*B60L 3/00* (2006.01)
*H02H 5/10* (2006.01)
*B60L 3/04* (2006.01)
*B60L 7/14* (2006.01)
*B60L 11/14* (2006.01)
*B60L 15/20* (2006.01)
*H02P 29/024* (2016.01)
*H02P 6/12* (2006.01)

(52) U.S. Cl.
CPC ............... B60L 11/14 (2013.01); B60L 15/20 (2013.01); H02H 5/105 (2013.01); H02P 6/12 (2013.01); H02P 29/0241 (2016.02); *B60L 2210/40* (2013.01); *B60L 2240/427* (2013.01); *B60L 2240/429* (2013.01); *Y02T 10/645* (2013.01); *Y02T 10/70* (2013.01); *Y02T 10/7077* (2013.01); *Y02T 10/7241* (2013.01); *Y02T 10/7275* (2013.01)

(58) Field of Classification Search
USPC .................. 361/42; 324/509; 318/400.21
See application file for complete search history.

(56) References Cited

U.S. PATENT DOCUMENTS

| | | | | |
|---|---|---|---|---|
| 2004/0212371 | A1* | 10/2004 | Nomoto | B60L 3/0023 324/522 |
| 2009/0001993 | A1* | 1/2009 | Lindsey | B60L 3/0023 324/509 |
| 2009/0323233 | A1* | 12/2009 | Shoemaker | B60L 3/0069 361/42 |
| 2010/0289336 | A1* | 11/2010 | Sugita | H02J 7/1423 307/66 |
| 2011/0310644 | A1* | 12/2011 | Ogura | H02M 7/5387 363/55 |
| 2012/0268079 | A1* | 10/2012 | Nakamura | H02J 7/0031 320/166 |
| 2014/0240875 | A1* | 8/2014 | Qian | H02H 3/16 361/42 |

FOREIGN PATENT DOCUMENTS

| | | |
|---|---|---|
| DE | 102011014561 | 1/2012 |
| DE | 102011051642 | 3/2012 |
| DE | 102012215542 | 4/2013 |

* cited by examiner

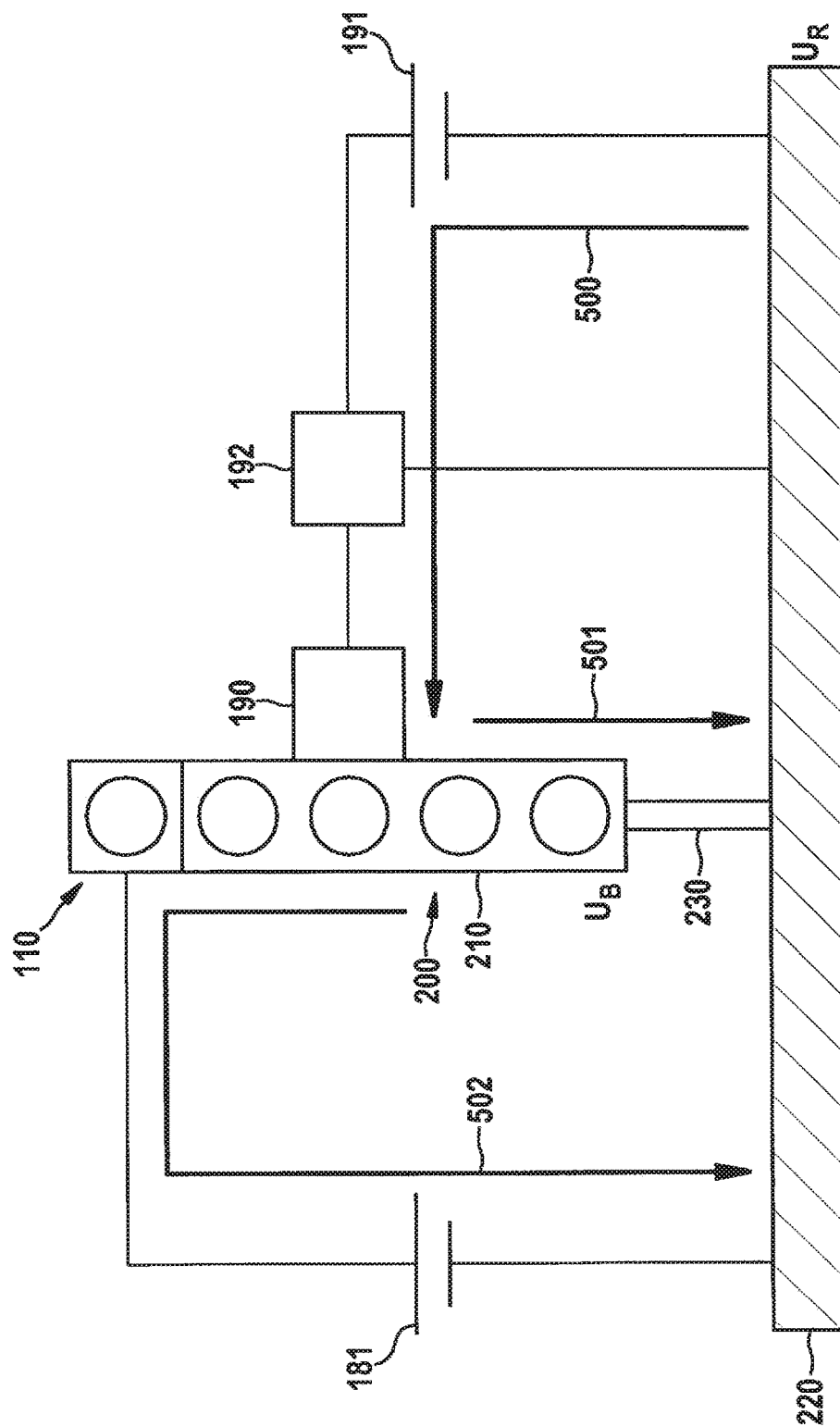

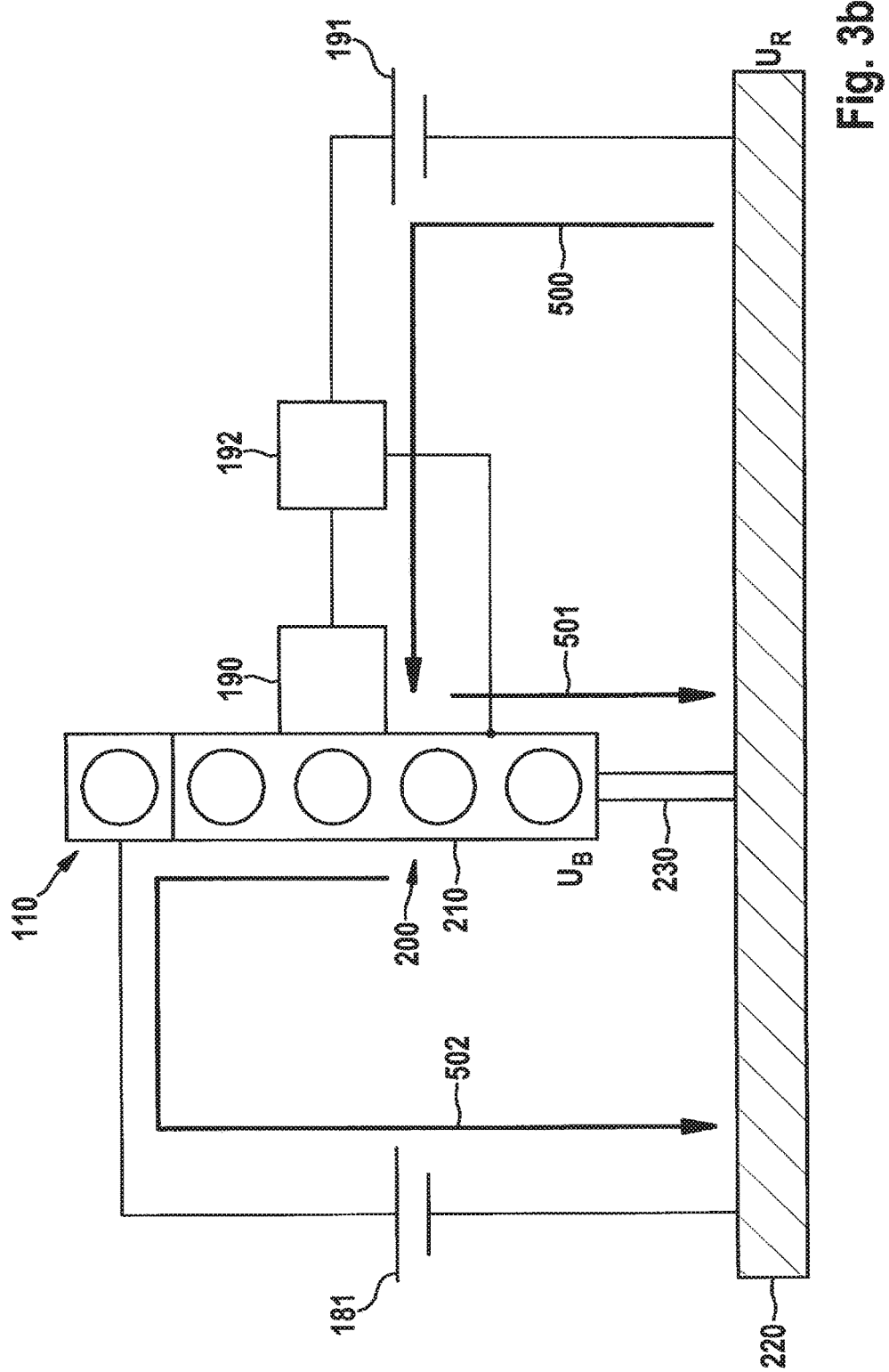

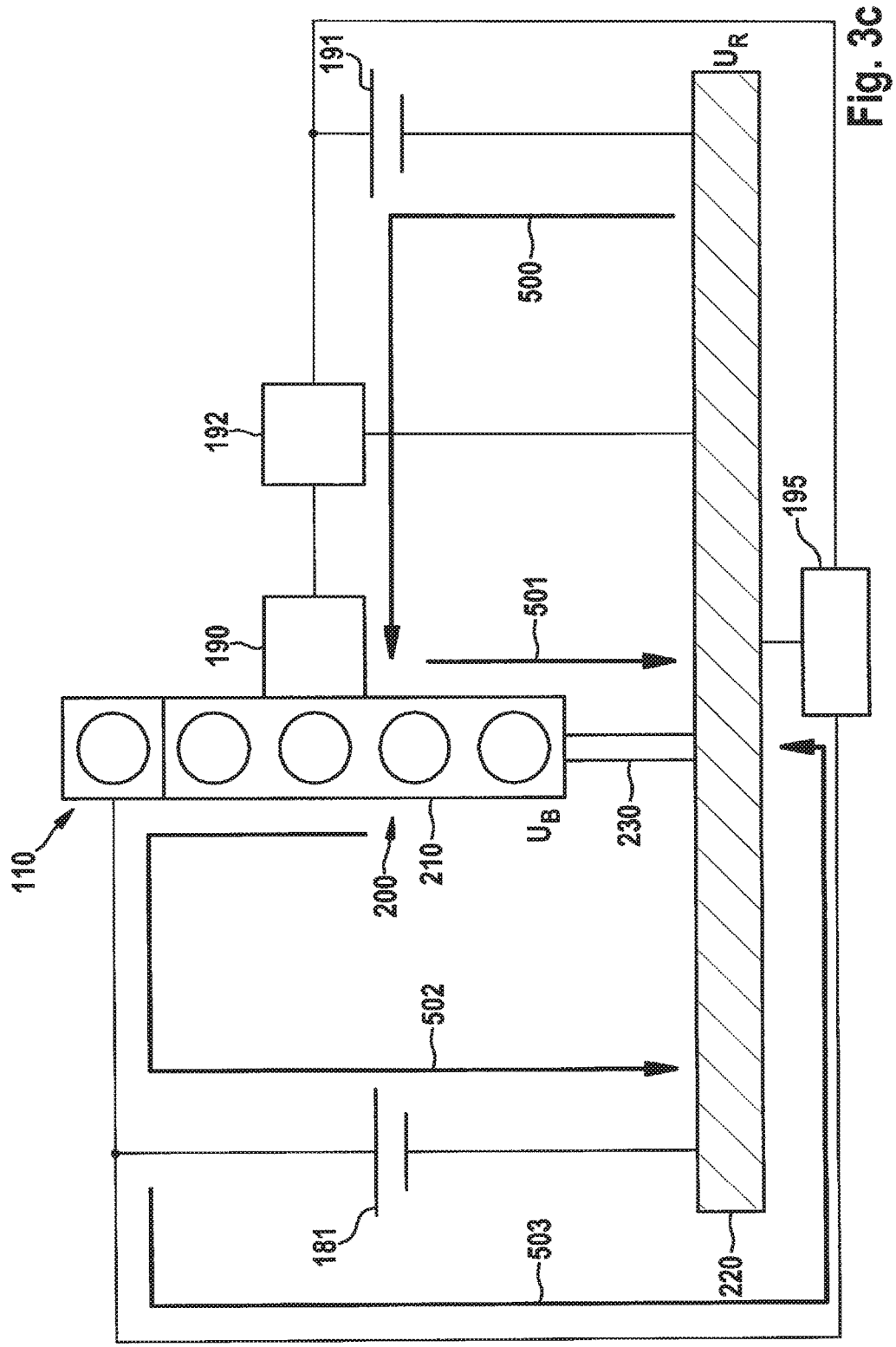

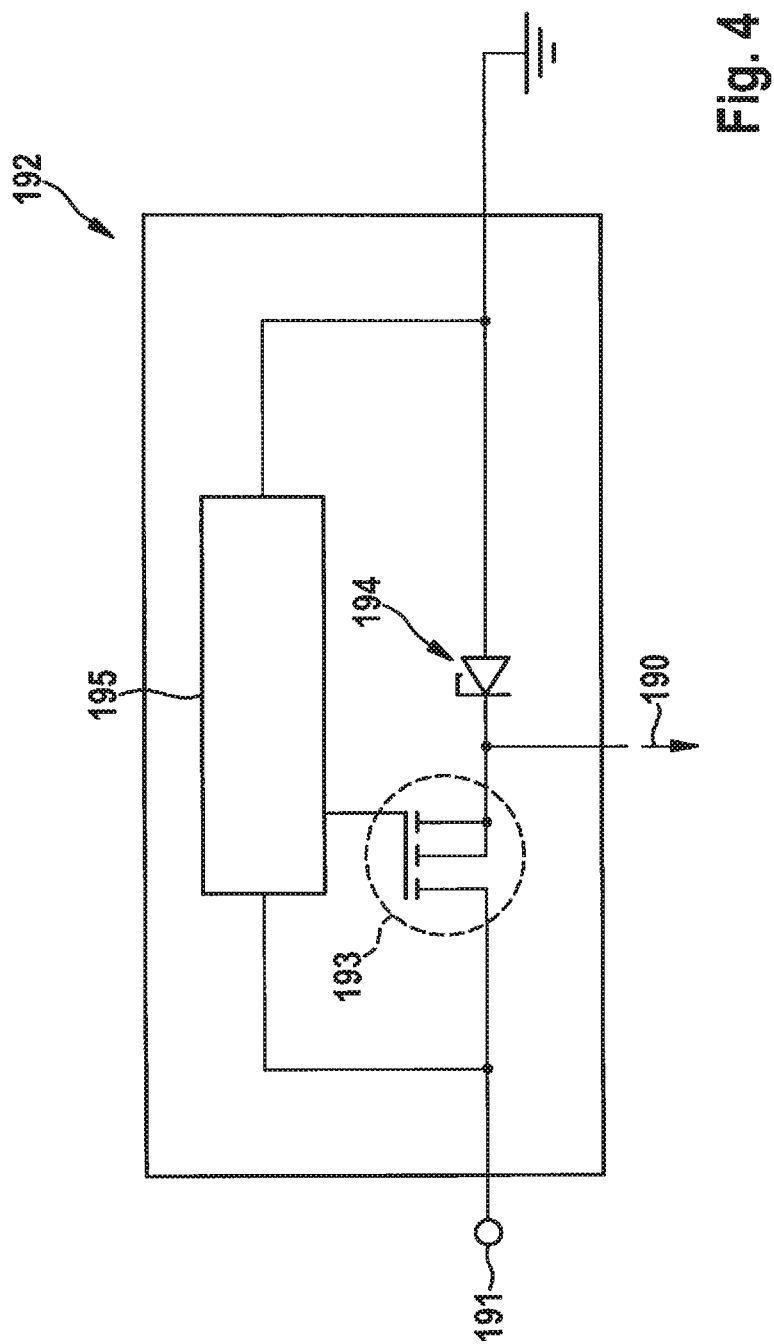

METHOD FOR OPERATING AN ELECTRIC MACHINE

FIELD

The present invention relates to a method for operating an electric machine.

BACKGROUND INFORMATION

Electric drives generally have two components. On the one hand, the electric drive has an electric machine which converts mechanical energy into electrical energy or vice versa (electromechanical transformer). The electric machine may be operated both in generator mode as a generator and in motor mode as an (electric) motor. On the other hand, the electric drive has a power inverter or an inverter/rectifier circuit. The power inverter converts an electrical AC voltage into an electric DC voltage or vice versa (electric transformer). In most cases such an inverter has electric switches, often power semiconductors such as MOSFETs, and is actuated by a logic circuit. The power inverter and logic circuit are jointly also referred to as inverter.

For construction-related reasons, electric machines are usually connected via their housing to the engine block of the internal combustion engine in a conductive and permanent manner. The engine block represents the electric ground for the electric machine (engine ground). An excitation coil of the electric machine, which is usually incorporated into a vehicle electrical system, establishes a connection between the voltage-side and ground-side terminal of the electric machine. At the same time, an energy store, in particular a battery or a corresponding capacitor, is incorporated into a vehicle electrical system by its positive pole, and connected to a chassis of the motor vehicle as ground via its negative pole. Consumers in the vehicle electrical system are also grounded via the chassis (chassis ground).

The engine ground thus constitutes a relative ground potential for the electric drive. The chassis ground constitutes a reference ground potential for the vehicle electrical system. In order to relate the engine block and the chassis to the same ground potential, the engine block and chassis are electrically connected via a ground line or a ground strap. If an interruption occurs on this ground line or a break in this ground strap (hereinafter referred to as ground strap break), the negative reference point of the electric drive is undefined. The relative ground potential can therefore rise or drop in an uncontrolled manner.

A ground strap break may result in damage to the electric drive. An overvoltage may occur if a ground strap break occurs in a regenerative operation of the electric drive. A ground strap break during an operation of the electric drive as motor may lead to a critical voltage of the logic circuit, which could lead to a reset and loss of control over the electric drive. The logic circuit must have a voltage supply at all times. If the logic circuit loses its energy supply, a faulty or even destructive functionality of the logic circuit may be the result. In the special case of a ground strap break, the logic circuit is unable to achieve its functionality.

Therefore, it is desirable to provide a possibility for transferring an electric drive into a safe operating state in the event of a ground strap break.

SUMMARY

According to the present invention, a method is provided for operating an electric machine. Advantageous refinements described below.

The electric machine, which may be operated both as an engine and a generator, is controlled with the aid of a logic circuit. The logic circuit in particular controls a power inverter of the electric machine, which includes electric switches, especially semiconductor switches, furthermore in particular MOSFETs, which connect phases of the electric machine to a vehicle electrical system or an energy source of a motor vehicle according to the stipulations of an engine or generator switching scheme. On the one hand, the power inverter of the electric machine has DC voltage terminals for the vehicle electrical system and AC voltage terminals for the electric phases of the electric machine, on the other. The logic circuit itself usually has an ASIC or similar device.

The electric drive, here in particular a DC voltage terminal of the power inverter, is electrically connected to a relative ground potential. In particular, the electric drive is electrically connected to an engine block of the internal combustion engine. An engine ground potential thus forms the relative ground potential, in particular. The relative ground potential is electrically connected to a reference ground potential via a ground strap or ground cable. The ground cable or ground strap in particular is an electric connection between the engine block of the internal combustion engine and a chassis of a vehicle in which the internal combustion engine is situated. A chassis ground potential thus forms the reference ground potential.

According to the present invention, a ground differential voltage between the relative ground potential and the reference ground potential is monitored. It is therefore possible, in particular, to monitor whether a ground strap break has occurred, e.g., when the ground strap is interrupted or breaks. Reaching an upper or a lower limit value of the ground differential voltage may be attributed to a ground strap rupture. In this case, a regular control, by which the electric drive is controlled during a regular operation, is deactivated. Instead, the logic circuit, and thus the electric machine, is brought into a special emergency operation.

The electric drive, thus, is transferred into a safe operating state in the event of a ground strap break. The special emergency operation actively stabilizes the relative ground potential. It is thereby ensured that the relative ground potential neither rises uncontrollably nor drops uncontrollably in the event of a ground strap break.

If the ground differential voltage reaches an upper limit value, the electrical machine will then be operated in a current-delivering operating state. An exceeding of the upper limit value means that the relative ground potential reaches an upper threshold and is too high or too positive. The relative ground potential should therefore be reduced.

With an increasing relative ground potential, the value of the relative ground potential becomes more and more positive in comparison with the value of the reference potential. The value of the relative ground potential approaches a value of a supply potential. This supply potential in particular is present in a vehicle electrical system to which the electric drive is connected.

The current-delivering operating state essentially corresponds to a regenerative operating state of the electric machine.

If the ground differential voltage reaches an upper limit value or drops below it, the electric machine will then be operated in a non-current-delivering operating state. A drop below the lower limit value means that the relative ground potential reaches a lower threshold and is too low or too negative. The relative ground potential should therefore be built up.

With a decreasing relative ground potential, the value of the relative ground potential increasingly approaches the value of the reference potential. The value of the relative ground potential drifts away from the value of the supply potential.

In the figurative sense, the non-current-delivering operating state corresponds to a motor-driven operating state of the electric machine. However, this does not necessarily have to mean that a rotor of the electric machine is actually moving. In the non-current-delivering operating state, in contrast to the regenerative or current-delivering operating state, no electrical energy is generated or output in the electric machine (figuratively, analogously to the motor-driven operating state). In particular, in the non-current-delivering operating state, a current flow between the DC voltage terminals is prevented through the electric machine. As a result, no current can flow out of the electric machine, i.e., no current can "leave" the electric machine.

For the most part, the value of the relative ground potential depends on a charge state of an intermediate circuit capacitor. This intermediate circuit capacitor in particular is switched in parallel with the logic circuit and furthermore, in particular in parallel with the electric machine. Moreover, the intermediate circuit capacitor is electrically connected to the relative ground potential, especially the engine block of the internal combustion engine. This charge state is a function of a current through the logic circuit, in particular. The charge state may also depend on currents through further components of the electrical drive, e.g., currents of a control unit, a field actuator, and/or an H-bridge. Depending on the direction of the currents through these components of the electric drive, the intermediate circuit capacitor will either be charged or discharged. These currents thus result in a change in the relative ground potential. Because of the control of the electric machine in the current-delivering or non-current-delivering operating mode according to the present invention, the intermediate circuit capacitor is able to be charged and discharged in a selective manner. The relative ground potential can thus be actively decreased and increased.

The present invention thus utilizes the already existing components for compensating the fault case of a ground strap break and for actively counteracting a risk to the electric drive. No additional components or structural alteration measures are required. In addition, complex protective measures can be eliminated by the present invention. Changes to the existing structural elements or additional structural elements may possibly be necessary only for sensing the ground strap break, but not for stabilizing the relative ground potential as such.

In the current-delivering operating state, the electric machine generates electrical energy. In the event of a ground strap break, the electric machine thereby charges the intermediate circuit capacitor. In addition, the generated electrical energy may be used for supplying the logic circuit with electrical energy. The engine ground potential thus is dissipated and the ground differential voltage reduced. That is to say, the engine ground potential is reduced in comparison with the supply potential. The engine ground potential thus approaches the reference ground potential. However, before the ground differential voltage becomes too low and an excessively high, critical voltage is present at the logic circuit, the electric drive switches into the noncurrent-delivering operating state.

In the non-current-delivering operating state, no electrical energy is generated, however. The intermediate circuit capacitor, which was charged in the current-delivering operating state, is now able to discharge itself in the non-current-delivering operating state. More specifically, the intermediate circuit capacitor discharges via the logic circuit and thereby supplies it with electrical energy.

As mentioned, the relative ground potential depends on the charge state of the intermediate circuit capacitor, which in turn is a function of the voltage. Since the intermediate circuit capacitor supplies the logic circuit with current in the non-current-delivering operating state, there is a drop in the voltage at the intermediate circuit capacitor, and thus in its charge state. On the other hand, the relative ground potential consequently increases in the direction of the supply potential. The relative ground potential thus rises because of the current that flows through the logic circuit. The relative ground potential is able to be actively built up, and the ground differential voltage rises.

Before the ground differential voltage becomes too high, or before the intermediate circuit capacitor has been discharged completely and the logic circuit is therefore no longer supplied with electrical energy, the electric drives switches back into the current-delivering operating state. This makes it possible to prevent a reset of the logic circuit and a loss of all control over the electric drive.

Because of this special emergency operation of the electric drive in the form of the current-delivering or non-current-delivering operating state in the event of a ground strap break, it can thus be prevented that the logic circuit loses its energy supply and also that an excessive, critical voltage is applied at the logic circuit.

In one advantageous development of the present invention, the electric machine is controlled for supplying a passive power rectification in the current-delivering operating state. The power inverter or the electrical switches of the power inverter are not explicitly controlled in so doing. The power inverter in particular includes MOSFETs, each having an inverse diode as a matter of principle. If the MOSFETs of the power inverter are not controlled, current is able to commutate via these inverse diodes. The inverse diodes constitute a system similar to a passive rectifier. Without control of the power inverter, it is therefore implicitly controlled as a passive rectifier.

The electric machine is preferably controlled in such a way in the current-delivering operating state that a magnet wheel voltage is generated or induced in the electric machine. The magnet wheel voltage corresponds to a voltage that is induced by an excitation current through a rotor winding of the rotor in a stator winding of the electric machine. The power inverter, in particular, is controlled as a step-up converter. An additional current source is created through the magnet wheel voltage, so that the relative ground potential can be reduced.

In the event that the magnet wheel voltage is too low for a rectifying operation, a back-and-forth switch can take place by a continuous change between a phase short-circuit and a passive power rectification (e.g., 8 kHz). In this way a step-up transformer effect comes about, which is independent of the rotor position and is able to produce a regenerative operation.

In one preferred development of the present invention, the electric machine is controlled in such a way in the non-current-delivering operating state that a phase short-circuit of the electric machine is created. Phase terminals of the electric machine are electrically connected to one another in the process. Individual DC voltage terminals of the electric machine in particular are not electrically connected to each other. This makes it possible to prevent a current flow through the electric machine. The phase short-circuit may arise at high-side or low-side terminals of the electric machine. As an alternative or in addition, a duty cycle of 50% may be selected for high-side terminals and low-side terminals in each case.

To stabilize a desired potential, the electric machine preferably switches between a non-current-delivering and a current-delivering operating state.

In one advantageous development of the present invention, the check of the ground differential voltage is performed in a regular operating mode of the electric drive. If a ground strap break occurs when the electric machine happens to be operated as a generator in the regular operating mode, the relative ground potential becomes more negative and a generator voltage rises as a result. This usually leads to the triggering of conventional overvoltage protection functions.

In parallel, the present invention achieves additional protection because the ground differential voltage drops.

However, if a ground strap break occurs when the electric machine happens to be operated as a motor in the regular operating mode, the relative ground potential becomes more positive. The generator voltage therefore decreases and the ground differential voltage rises. No conventional overvoltage protection functions are triggered in this case. This may lead to a critical voltage of the logic circuit, which could result in a reset and in a loss of all control over the electric drive.

By checking the ground differential voltage within the meaning of the present invention in the regular operating mode of the electric drive, it is therefore ensured that the electric drive is always brought into the safe operating mode when a loss of the electric ground has occurred. Even when the electric machine is operated as a motor in the regular operating mode, it is possible to detect the occurrence of a ground strap break in a timely manner. In this case, as well, the electric drive can be brought into the safe operating mode.

Because of the present invention, a ground strap break, if it occurs during the motor-driven or regenerative operation of the electric machine, is able to be compensated in an effective and reliable manner. In addition, conventional overvoltage protection functions can be safeguarded and improved in the event of a ground strap break in the regenerative operation of the electric machine.

The ground differential voltage is preferably ascertained with the aid of a sensor element, the sensor element in particular including a measuring resistor. If the ground differential voltage reaches one of the limit values, the sensor element can output an error message, in particular. In particular, this error message is output by the sensor element to the logic circuit directly or indirectly (for instance via a higher-order control unit). In response, the logic circuit actuates the electric machine in the corresponding current-delivering or non-current-delivering operating state. The sensor element in particular may acquire a value of the relative ground potential and the reference ground potential and compare them to each other.

As an alternative or in addition, the ground differential voltage may be acquired directly, for instance with the aid of a corresponding measuring resistor. This directly acquired value of the ground differential voltage in particular may be used to verify the value ascertained by the sensor element. It is therefore possible to check again that a ground strap break did indeed occur before the electric drive is operated in the current-delivering or non-current-delivering operating mode.

In one preferred development, a method according to the present invention is used for a vehicle electrical system that includes not only the electric drive but also at least one further electric component, which in particular is supplied from its own current source which is connected to the relative ground potential on the ground side. More specifically, the at least one further electric component is an actuator or multiple actuators, such as fuel injectors, which are provided for operating the internal combustion engine and thus are connected to the motor block as relative ground potential on the ground side. The relative ground potential is thereby also controllable for these further actuators if a ground strap break occurs. An (ongoing) operation of the actuators is possible.

For the ongoing operation of the component in a ground strap break, a current circuit from the component through the electric drive to a chassis at the reference ground potential is preferably established. This allows the further operation of this electric component, and the internal combustion engine can continue to be operated.

A computer unit according to the present invention, e.g., the described logic circuit, is designed, in particular in terms of its programming, to execute a method according to the present invention. An electric drive according to the invention has an electric machine provided with a power inverter and a logic circuit according to the present invention. It is particularly suitable for use in motor vehicles.

The implementation of the method in the form of software also is advantageous, since the costs are particularly low, especially if an executing control unit will be used for other tasks as well and therefore is present as it is. Suitable data carriers for providing the computer program in particular are diskettes, hard disks, flash memories, EEPROMs, CD-ROMs, DVDs, etc. A download of a program via computer networks (Internet, intranet, etc.) is possible as well.

Further advantages and developments of the present invention derive from the description and the enclosed figures.

It is understood that the features mentioned above and the features yet to be explained below may be used not only in the combination indicated in each case but also in other combinations or in isolation, without departing from the scope of the present invention.

The present invention is shown schematically in the figures on the basis of exemplary embodiments and described in detail below with reference to the figures.

BRIEF DESCRIPTION OF THE DRAWINGS

FIGS. 3a-3c schematically show a vehicle electric system having an electric drive of an internal combustion engine and a further electric component, which is designed to execute a further specific embodiment of method according to the present invention.

FIG. 4 schematically shows a control unit for supplying a further electric component according to FIGS. 3a-3c with current.

DETAILED DESCRIPTION OF EXAMPLE EMBODIMENTS

Figure 1:
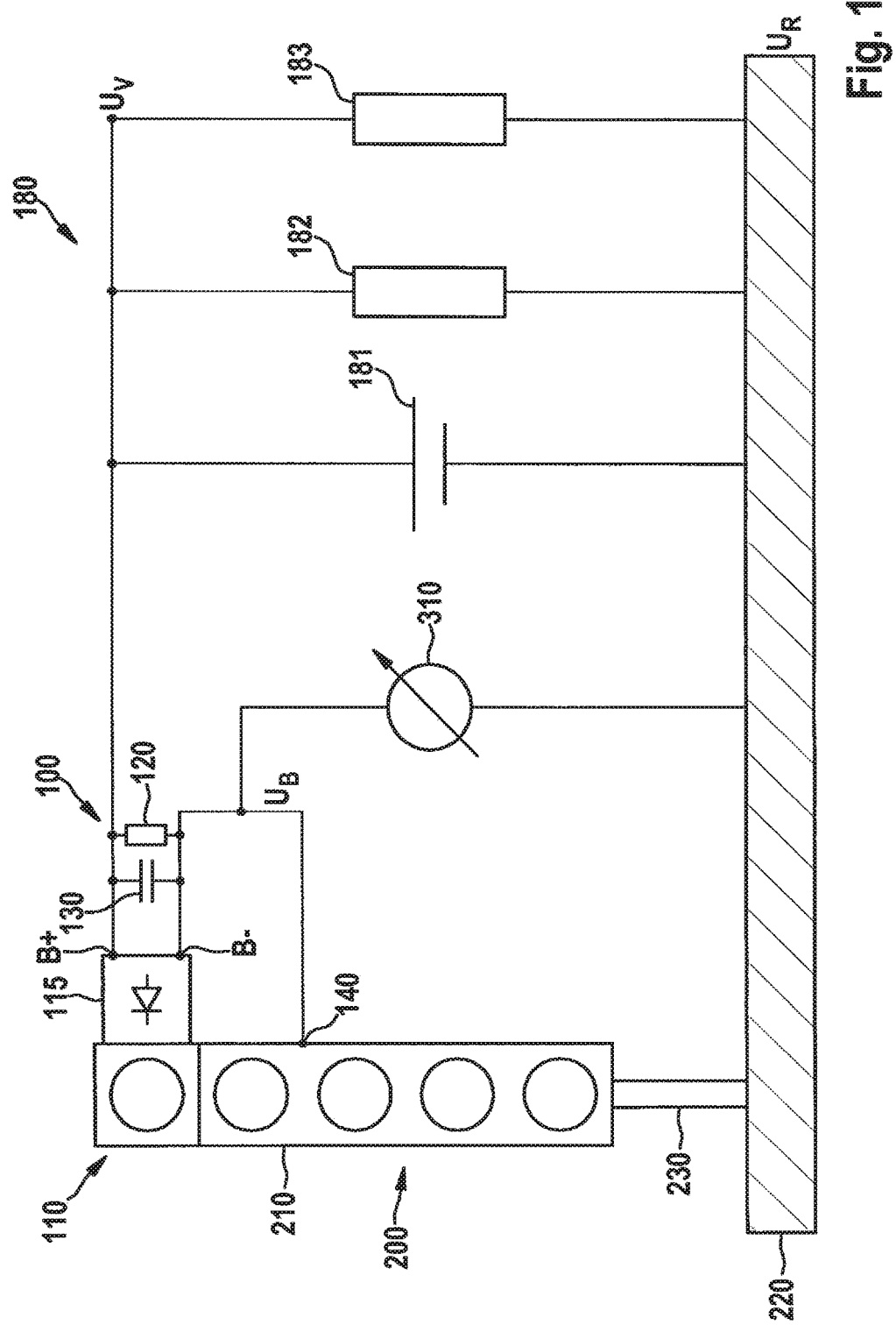
FIG. 1 schematically shows a vehicle electric system having an electric drive of an internal combustion engine, which is designed to execute a specific embodiment of a method according to the present invention.

FIG. 1 schematically illustrates an electric drive, which i denoted by 100. Electric drive 100 is linked to an internal combustion engine 200 of a motor vehicle. Electric drive 100 is equipped with an electric machine 110, which can be operated both as a generator and a motor. For this purpose, the electric machine has, inter alia, a power inverter 115 including electrical switches, especially semiconductor switches. Power inverter 115 of electric machine 110 has DC voltage terminals 33+, B− for a vehicle electrical system 180 on the one side, and AC voltage terminals for the electrical phases of the electric machine on the other side.

To actuate electric machine 110, in particular power inverter 115, the electric machine has a logic circuit 120. An intermediate circuit capacitor 130 is connected in parallel to logic circuit 120.

For example, vehicle electrical system 180 may include an energy store 181 and electrical consumers 181, 182. A positive potential of vehicle electrical system 180 is referred to as supply potential $U_v$ here.

In addition, electric drive 100 has a ground connection 140. The ground connection in particular is electrically connected to an engine block 210 of internal combustion engine 200. Engine block 210 of internal combustion engine 200 is used as a ground connection and thus as relative ground potential $U_B$ of electric drive 100. The ground connection between engine block 200 and electric drive 100 may be realized via a housing of electric machine 110.

Electric components 181, 182, 183 of vehicle electrical system 180 are connected to a reference potential $U_R$. Reference potential $U_R$ is formed by a chassis 220 of the motor vehicle. In order to relate engine block 210 of internal combustion engine 2 00 and chassis 220 to the same ground potential, engine block 210 and chassis 220 are connected to one another via a ground strap 230.

Logic circuit 120 is designed to actuate electric machine 110. Logic circuit 12 0 is furthermore designed to carry out a preferred specific embodiment of a method according to the present invention. Logic circuit 12 0 ascertains a ground differential voltage between relative ground potential $U_B$ and reference ground potential $U_R$. In particular, logic circuit 120 records the ground differential voltage directly using a corresponding measuring resistor 310. Logic circuit 120 monitors whether the ground differential voltage reaches a limit value. A ground strap break may thus be inferred. Such a ground strap break in particular means that the ground connection or ground strap 23 0 is interrupted or severed due to a fault.

Figure 2:
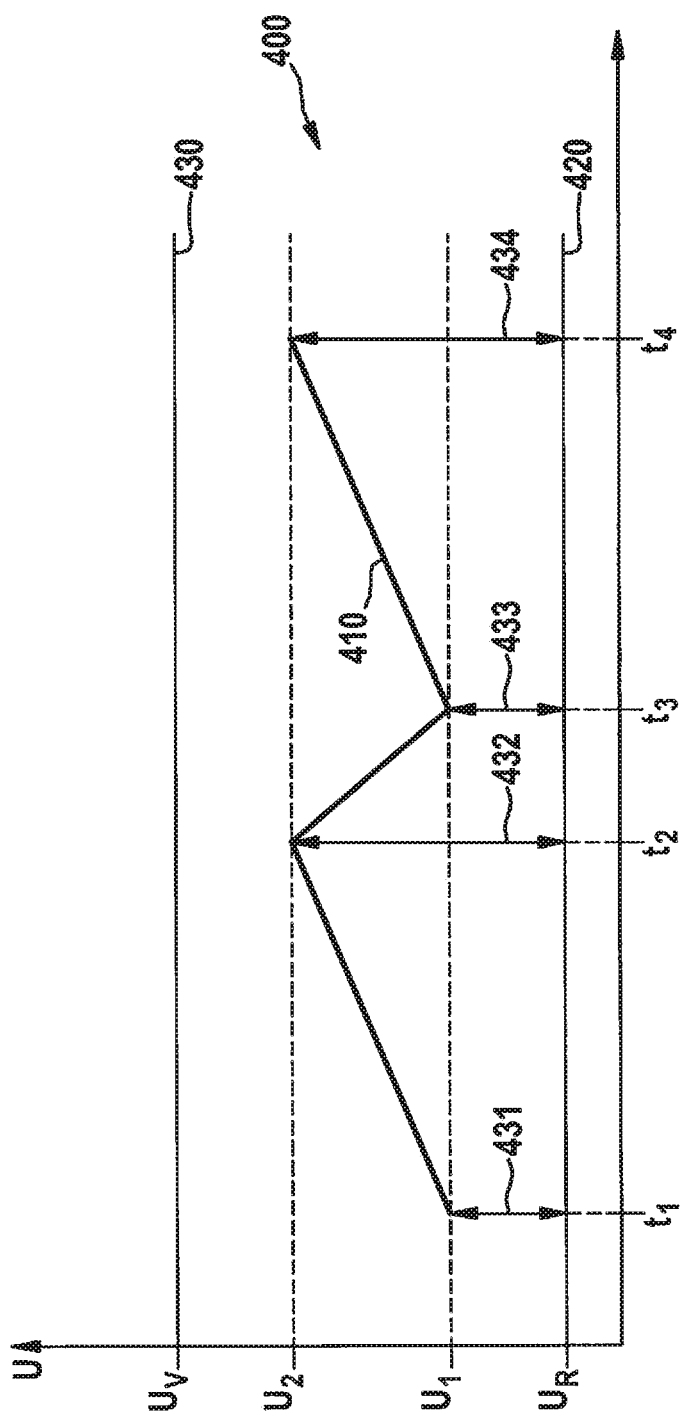
FIG. 2 schematically shows a voltage diagram, which is able to be ascertained in the course of a preferred specific embodiment of a method according to the present invention.

FIG. 2 schematically illustrates a voltage diagram 400. Voltage diagram 400 is able to be ascertained by control unit 300 in the course of one specific embodiment of the method of the present invention.

A first voltage characteristic 410 in voltage diagram 400 describes the relative ground potential over the time. A second voltage characteristic 420 describes the reference ground potential over the time. A third voltage characteristic 430 describes the supply potential over the time.

A difference between first and second voltage characteristic 410 and 420 forms the ground differential voltage. In the event of a ground strap break, relative ground potential 410 is stabilized.

At an instant $t_1$ the ground differential voltage assumes a value 431, which corresponds to a lower limit value. The relative ground potential reaches a lower threshold $U_1$. Logic circuit 120 thereupon controls electric machine 110 in a non-current-delivering operating state. In so doing, a phase short-circuit of electric machine 110 is generated, so that no current can leave electric machine 110. Logic circuit 120 is supplied with electrical energy by intermediate circuit capacitor 130, which is thereby discharged. Relative ground potential 410 may rise or be built up as a result, and increases in the direction of supply potential 430. The ground differential voltage rises as a result.

At a second instant $t_2$, the ground differential voltage assumes a value 432, which corresponds to an upper limit value.

Relative ground potential 410 reaches an upper threshold $U_2$. Logic circuit 120 then controls electric machine 110 in a current-delivering operating state, in particular in accordance with a passive rectification. In so doing, electric machine 110 is actuated in a manner similar to a regenerative operating state. Electric machine 110 converts mechanical energy into electric energy in the process. Intermediate circuit capacitor 130 thus can be charged and logic circuit 120 is supplied with electric energy. Relative ground potential 420 then is able to dissipate. The ground differential voltage decreases as a result.

At an instant $t_3$, the ground differential voltage assumes a value 433, which corresponds to the lower limit value again. After that, logic circuit 120 actuates electric machine 110 in the non-current-delivering operating state again until the ground differential voltage assumes a value 434 at instant $t_4$, which in turn corresponds to the upper limit value.

FIGS. 3a, 3b and 3c schematically illustrate the vehicle electrical system from FIG. 1 in simplified form together with internal combustion engine 200, electric machine 110 and chassis 220. In addition, a further electric component developed as actuator 190 is shown, which has an electrical connection to engine block 210 of internal combustion engine 200 on the ground side. On the voltage side, actuator 190 is supplied with current by a control unit 192. In this instance, control unit 192 is supplied with current by a current source 191 again, but may alternatively also be supplied by electric machine 110 or by energy store 181.

On the ground side, control unit 192 may be connected to the chassis, as shown in FIG. 3a, or also to engine block 210, as shown in FIG. 3b. FIG. 3c illustrates the scenario from FIG. 3a, where a DC converter 195 is provided in addition, which is required if electric machine 110 or energy store 181 and actuator 190 are operated at different voltage levels, i.e., different vehicle electrical system voltages.

Actuator 190, for example, may be a fuel injector required for the operation of internal combustion engine 200. Multiple such actuators are usually provided, which are supplied with current separately or jointly. However, only one actuator 190 is illustrated for reasons of clarity.

Since actuator 190 is connected to the same relative ground potential $U_B$ as electric machine 110, which in this case is engine block 210, the relative ground potential of actuator 190 is controlled as well in the control of the relative ground potential via the ground differential voltage.

In a normal operation, i.e., with an intact ground strap 230, an electrical connection exists between relative ground potential $U_B$ and reference ground potential $U_R$, i.e., between engine block 210 and chassis 220. A current flow through actuator 190 is indicated by arrows 500 and 501 for this case, which lead from chassis 220 via current source 191, control unit 192, actuator 190, and engine block 210 via ground strap 230 back to chassis 220.

In the event of a ground strap break, no electrical connection is possible between engine block 210 and chassis 220 via ground strap 230 any longer. For that reason, as indicated by arrows 500 and 502, the current flow is routed from chassis 220 via current source 191, control unit 192, actuator 190, engine block 210, electric machine 110, and energy store 181 back to chassis 220. In this way actuator 190 can continue to be supplied with current and the operation of internal combustion engine 200 be maintained provided relative ground potential $U_B$ is stabilized according to the previously described method in so doing.

FIG. 4 schematically illustrates a control unit 192 in enlarged form. A switch 193, via which a connection between actuator 190 and current source 191 is able to be established, and a freewheeling diode 194, by way of which a connection exists between ground (either $U_B$ or $U_R$, depending on the specific embodiment) and actuator 190. A logic of the control unit is denoted by 195.

In a normal operation, actuator 190, which usually includes an inductivity (e.g., solenoid injector), is operated via control unit 192 in the manner of a step-down transformer, i.e., when switch 193 is open a current circuit exists through actuator 190 via free-wheeling diode 194. This freewheeling operation via free-wheeling diode 193 is no longer possible in case of the ground strap break. For practical purposes, the actuator is therefore designed to discharge the freewheeling current, especially via the engine block.

The actuator is usefully also designed or set up to discharge a freewheeling current when it is in a switched-on yet inactive state.

In case of a ground connection of control unit 192 to chassis 220 (i.e., reference ground potential $U_R$), as shown in FIGS. 3a and 3c, it must be ensured in a system of this type that relative ground potential $U_B$ does not drop below a breakdown voltage (approx. −0.5V with respect to $U_R$) of freewheeling diode 194, i.e., the lower limit value of the ground differential voltage is specified as a function of actuator 190 in this instance.

Instead of via energy store 181, the current flow to electric machine 110 may just as well be routed back to chassis 220 via DC voltage converter 195, as sketched by arrow 503.

What is claimed is:

1. A method for operating an electric machine including a power inverter, which is electrically connected to a relative ground potential, the method comprising:
    monitoring a ground differential voltage between the relative ground potential and a reference ground potential;
    operating the electric machine as a generator if the ground differential voltage reaches an upper limit value; and
    operating the electric machine in such a way that no current flow takes place through the electric machine between DC voltage terminals of the electric machine if the ground differential voltage reaches a lower limit value.

2. The method as recited in claim 1, wherein the electric machine is operated as a motor in a non-current-delivering operating state.

3. The method as recited in claim 1, wherein, during the operating of the electric machine as the generator, the power inverter of the electric machine is in a current-delivering operating state for supply of a passive power rectification.

4. The method as recited in claim 1, wherein the power inverter is controlled in a current-delivering operating state in such a way that a magnet wheel voltage is generated in the electric machine.

5. The method as recited in claim 2, wherein the power inverter is controlled in the non-current-delivering operating state in such a way that a phase short-circuit of the electric machine is produced.

6. The method as recited in claim 1, wherein the monitoring of the ground differential voltage takes place in a regular operating mode of an electric drive that includes the electric machine and a logic circuit that controls the electric machine.

7. The method as recited in claim 1, wherein the ground differential voltage is ascertained with the aid of a sensor element.

8. A logic circuit designed to operate an electric machine including a power inverter, which is electrically connected to a relative ground potential, the logic circuit configured to:
    monitor a ground differential voltage between the relative ground potential and a reference ground potential;
    operate the electric machine as a generator if the ground differential voltage reaches an upper limit value; and
    operate the electric machine in such a way that no current flow takes place through the electric machine between DC voltage terminals of the electric machine if the ground differential voltage reaches a lower limit value.

9. An electric drive of an internal combustion engine, having an electric machine provided with a power inverter, and a logic circuit, the logic circuit designed operate an electric machine including a power inverter, which is electrically connected to a relative ground potential, the logic circuit configured to:
    monitor a ground differential voltage between the relative ground potential and a reference ground potential;
    operate the electric machine as a generator if the ground differential voltage reaches an upper limit value; and
    operate the electric machine in such a way that no current flow takes place through the electric machine between DC voltage terminals of the electric machine if the ground differential voltage reaches a lower limit value.

10. A machine-readable storage medium storing a computer program, the computer program, when executed, induces a logic circuit to execute a method for operating an electric machine including a power inverter, which is electrically connected to a relative ground potential, the method comprising:
    monitoring a ground differential voltage between the relative ground potential and a reference ground potential;
    operating the electric machine as a generator if the ground differential voltage reaches an upper limit value; and
    operating the electric machine in such a way that no current flow takes place through the electric machine between DC voltage terminals of the electric machine if the ground differential voltage reaches a lower limit value.

11. A system comprising:
    an electric machine configured to operate as a generator to generate current;
    an electrical system that includes a logic circuit, wherein the logic circuit is electrically connected to terminals of the electric machine;
    a first ground to which the electric machine is grounded; and
    a second ground to which the electrical system is grounded;
    wherein:
        the electrical system includes a line (a) that is connected to the first ground so that a potential of the first ground is provided onto the line and (b) that forms at least a part of the electrical connection of the logic circuit to the electric machine; and the logic circuit is configured to:
- measure a difference between the potential of the first ground provided onto the line and a potential of the second ground;
- respond to the measured difference reaching a predefined high threshold value by controlling the electric machine to generate a current at the terminals, thereby causing a value of the potential of the first ground to lower, which reduces the difference between the potential of the first ground and the potential of the second ground; and
- respond to the measured difference reaching a predefined low threshold value by controlling the electric machine so that current is not generated at the terminals by the electric machine, thereby causing a value of the potential of the first ground to rise, which increases the difference between the potential of the first ground and the potential of the second ground.

12. The system as recited in claim 11, wherein the first ground is a body of an engine of a vehicle and the second ground is a chassis of the vehicle.

13. The system as recited in claim 11, wherein the electric machine includes an inverter and the terminals are terminals of the inverter.

14. The system as recited in claim 11, wherein:
the electrical system includes a capacitor;
the controlling of the electric machine so that current is not generated at the terminals by the electric machine in response to the measured difference reaching the predefined low threshold value causes the capacitor to discharge, the capacitor thereby supplying electrical energy to the logic circuit and raising the value of the potential of the first ground; and
the controlling of the electric machine to generate the current in response to the measured difference reaching the predefined high threshold value causes the electric machine to charge the capacitor, and supply the logic circuit, with electrical energy into which the electric machine converts mechanical energy, thereby lowering the value of the potential of the first ground.

15. The system as recited in claim 11, wherein the electrical system further includes a measuring resistor, and the logic circuit is configured to measure the difference between the potentials of the first ground and the second ground using the measuring resistor.

16. The system as recited in claim 15, wherein the potential of the second ground is connected to the line that is connected to the first ground via the measuring resistor.

17. The system as recited in claim 11, further comprising an actuator that is grounded to the first ground, the rising and lowering of the potential of the first ground thereby changing the grounding of the actuator.

18. The system as recited in claim 17, wherein the actuator is a fuel injector.

19. The system as recited in claim 17, wherein the actuator is controlled by a control unit that is powered by the electric machine.

20. The system as recited in claim 11, wherein the electric machine is also configured to operate as a motor.

21. The system as recited in claim 11, wherein:
the electric machine is connected to a voltage source;
the first ground is a body of an engine of a vehicle;
the second ground is a chassis of the vehicle;
the first ground is directly connected to the second ground by a ground strap so that a same potential is at the first and second grounds;
the electrical system includes a capacitor connected to the first ground;
the electrical system includes, connected to the voltage source and grounded to the second ground, at least one of (a) one or more electrical consumers and (b) an energy store;
the system is configured for the electric machine to operate as a motor and as a generator in a normal mode, which is while the ground strap is intact;
the response by the logic circuit to the measured difference reaching the predetermined high threshold value and the response by the logic circuit to the measured difference reaching the predefined low threshold occurs cyclically, such that (a) the response to the measured difference reaching the predefined high threshold value causes the difference between the potential of the first ground and the potential of the second ground to gradually lower until the difference reaches the predefined low threshold value, thereby triggering the logic circuit to respond to the measured difference reaching the predefined low threshold and (b) the response to the measured difference reaching the predefined low threshold value causes the difference between the potential of the first ground and the potential of the second ground to gradually rise until the difference reaches the predefined high threshold value, thereby triggering the logic circuit to respond to the measured difference reaching the predefined high threshold;
the system is configured to enter a safe mode, in which the cyclical responses by the logic circuit to the reaching of the predetermined high and low thresholds by the measured difference occur, in response to the first and second grounds being disconnected from each other by a failure of the ground strap;
the controlling of the electric machine so that current is not generated at the terminals by the electric machine in response to the measured difference reaching the predefined low threshold value causes the capacitor to discharge, the capacitor thereby supplying electrical energy to the first ground, raising the value of the potential of the first ground; and
the controlling of the electric machine to generate the current in response to the measured difference reaching the predefined high threshold value causes the electric machine to charge the capacitor, the capacitor thereby not supplying electrical energy to the first ground, thereby lowering the value of the potential of the first ground.

22. The system as recited in claim 21, wherein the logic circuit does not perform the cyclical responses when the system is in the normal mode.

* * * * *